United States Patent
Narin (10) Patent No.: US 7,039,801 B2
(45) Date of Patent: May 2, 2006

(54) SYSTEM AND METHOD FOR INTEGRATING SECURE AND NON-SECURE SOFTWARE OBJECTS

(75) Inventor: Attila Narin, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 1008 days.

(21) Appl. No.: 09/837,904

(22) Filed: Apr. 19, 2001

(65) Prior Publication Data

US 2002/0002673 A1    Jan. 3, 2002

Related U.S. Application Data (60) Provisional application No. 60/215,342, filed on Jun. 30, 2000.

(51) Int. Cl.
*H04L 9/00* (2006.01)

(52) U.S. Cl. ............... 713/152; 713/2; 713/164; 713/165; 713/166; 713/167; 726/26

(58) Field of Classification Search ............ 713/162, 713/164–167, 152; 726/26
See application file for complete search history.

(56) References Cited

U.S. PATENT DOCUMENTS

| | | | |
|---|---|---|---|
| 6,049,838 A * | 4/2000 | Miller et al. .......... | 719/315 |
| 6,108,715 A * | 8/2000 | Leach et al. .......... | 719/330 |
| 6,330,670 B1 * | 12/2001 | England et al. ........ | 713/2 |
| 6,434,679 B1 * | 8/2002 | de Bonis-Hamelin et al. ............. | 711/161 |
| 6,487,665 B1 * | 11/2002 | Andrews et al. ....... | 713/201 |

OTHER PUBLICATIONS

AA "Classes and Servers," 1998, http://msdn.microsoft.com/library/partbook/ecom/classesservers.htm, 6 pages.

* cited by examiner

*Primary Examiner*—Gilberto Barrón, Jr.
*Assistant Examiner*—Samson Lemma
(74) *Attorney, Agent, or Firm*—Woodcock Washburn LLP (57) ABSTRACT

A secure first process uses a non-secure software object by hosting said non-secure software object in a separate second process, where the first process's address space is inaccessible to the second process. The first process communicates with the second process, preferably by means of a COM API that the second process exposes to the first process. The application that runs in the second process may expose APIs of the hosted non-secure object to the first process, and the first process may communicate with the non-secure object hosted in the second process through this API. In a preferred embodiment, the second process renders its output in a child window of the first process, so that the use of a second process to host non-secure software objects is transparent to a user of the first process.

24 Claims, 5 Drawing Sheets

SYSTEM AND METHOD FOR INTEGRATING SECURE AND NON-SECURE SOFTWARE OBJECTS

CROSS-REFERENCE TO RELATED CASES

This application claims the benefit of U.S. Provisional Application Ser. No. 60/215,342, entitled "Method and System for Using Open Platforms in Applications Employing a Digital Rights Management System," filed on Jun. 30, 2000.

FIELD OF THE INVENTION

The present invention relates generally to the field of computer security. More particularly, the invention provides a system and method for using secure and non-secure software objects together, without compromising the secure object's ability to protect itself and the data on which it operates.

BACKGROUND OF THE INVENTION

Many applications handle protected content, such as copyrighted text, audio, video, etc., that is protected by a digital rights management system. Typically, the protection of content is achieved by encrypting the content and allowing it to be decrypted and handled in clear-text form only by trusted applications. "Trust" of an application is generally established by incorporating security measures into the application (e.g., encrypted code, integrity checks, obfuscated cryptographic keys, etc.), and executing the trusted application in its own process so that the data handled by the trusted application is not available to other processes.

While isolating a trusted application in its own process provides excellent protection for the trusted content, doing so deprives the application of one of the benefits of executing on an open platform: the ability to integrate with other applications running on the same platform. Typically, when a first application needs to use some capability available in a second application, the first application will simply run the separate application within its own process. For example, the designers of an application may wish to provide a limited form of web browsing capability within their application. Rather than re-invent the wheel by writing browser capability into the program from scratch, the designers may allow the application to run a browser (such as the INTERNET EXPLORER browser) in the same process. However, if the application is trusted, running a browser "in-proc" may subvert the security scheme of the trusted application. The browser code may not be secure to the same extent as the trusted application. Even if the browser code itself is secure, the browser provides the capability to import executable code from other sources that may not be trusted. If trust is to be maintained, executable code from unknown sources cannot be given access to the address space of the trusted application and therefore cannot be run in process.

In view of the foregoing, there is a need for a technique for integrating general-purpose application with trusted applications that overcomes the drawbacks of the prior art.

SUMMARY OF THE INVENTION

The present invention provides a technique for integrating untrusted or "open" features into a "closed" process. In accordance with the invention, an open or untrusted application is run in a separate, auxiliary process from the closed or protected application. The auxiliary process is creating by running a "hosting" application that has minimal functionality—just enough to be able to host an application and to communicate with the closed process. The auxiliary process is started by the closed process; the closed process controls the lifetime of the auxiliary process and terminates it when the open features that it provides are no longer necessary.

In a preferred embodiment, the trusted or closed application is a rendering application that incorporates digital rights management functionality to protect copyrighted content. Such an application may include a limited web-browsing service (such as the integrated shopping feature described in U.S. Provisional Application No. 60/215,488, entitled "Integrated Bookstore," filed on Jun. 30, 2000), which is performed on behalf of the rendering application by the INTERNET EXPLORER browser. The rendering application starts an application called "browser_host.exe" in a separate process. browser_host.exe contains sufficient functionality to host the INTERNET EXPLORER browser, and also exposes a high-level interface to communicate with the closed application (e.g., via COM, WINDOWS messaging, etc.), and also provides a way to expose interfaces of the hosted browser. Preferably, a child window of the rendering application is created, and the browser_host.exe process renders its output into this window. Since the child window is in the same display location as the main window of the rendering application, it appears to the user as if the web browsing functionality is being provided by the rendering application. The user is unaware that the web browsing functionality is being provided by a separate program running within a separate process.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

In a world where computers are increasingly called upon to handle secure or sensitive information, there is a tension between trusted applications and "open" applications. Trusted applications typically provide a circumscribed set of functions that cannot be extended by a user, which means that such applications can be trusted to handle sensitive content in predictable ways. Open applications, on the other hand, provide a wide range of functionality that is, in some cases, user expandable—some open applications, such as browsers, can execute code that is user-implemented or imported from other sites on the Internet. However, the very flexibility that makes open applications useful in a wide variety of situations also makes them inappropriate for handling sensitive information. An open application may import code that could subvert the security scheme designed to protect whatever sensitive information the open application might be handling. However, it is sometimes useful to package the functions of an open application together with those of a secure application. For example, it may be useful for a secure content-rendering application (e.g., one that renders copyrighted material) to provide a feature that allows the user to shop for copyrighted material with a web browser. The present invention provides a technique that allows the functions of a secure application to be integrated with those of an open application.

Exemplary Computing Environment

Figure 1:
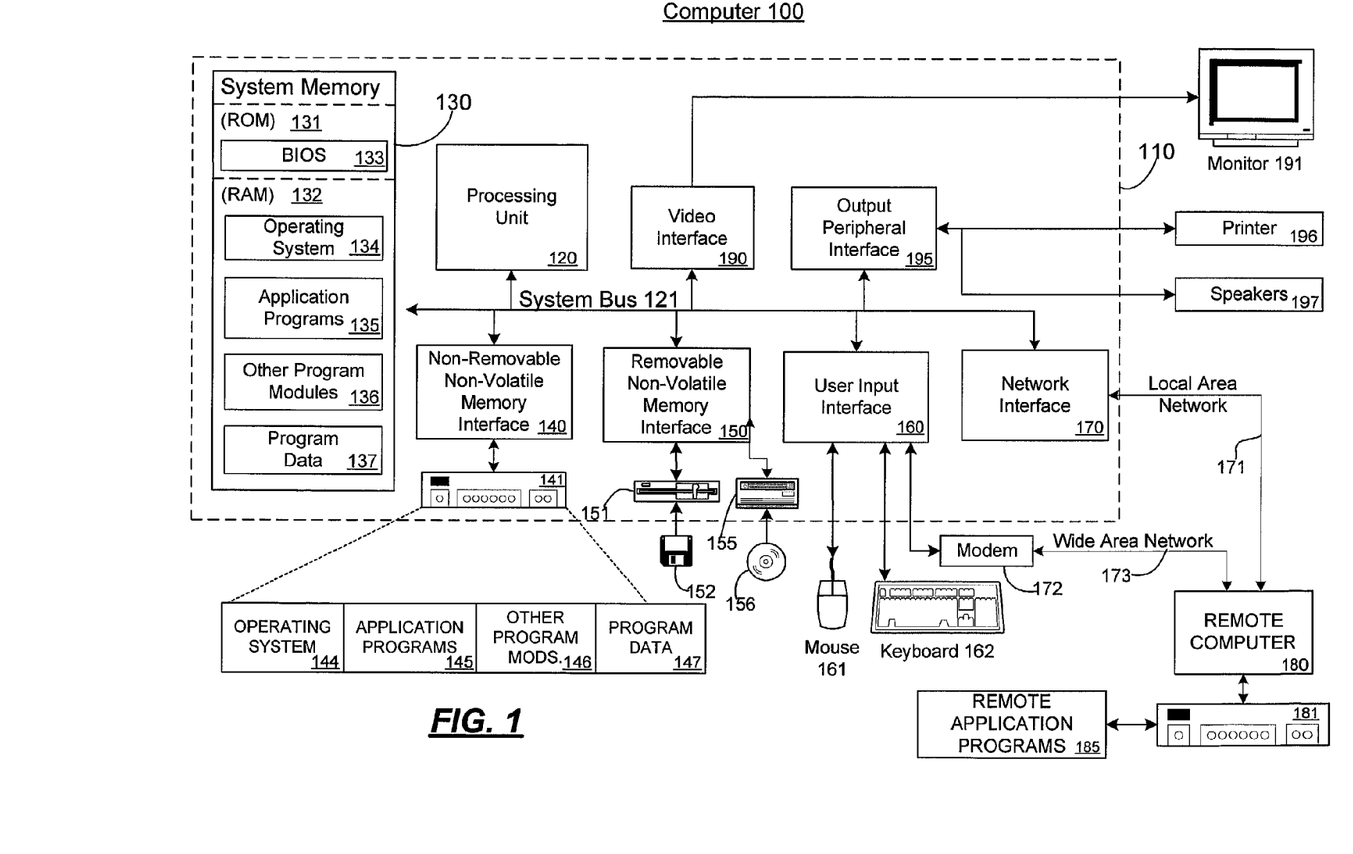
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Separation of Processes

Operating system 134 provides an environment in which software objects on computer 110 may execute. One aspect of the environment provided by operating system 134 is a facility for creating and managing separate processes. Each process provides, among other things, a block of memory that is accessible from within the process, but that is not accessible to other processes. In general, plural processes can run concurrently within the same environment.

Figure 2:
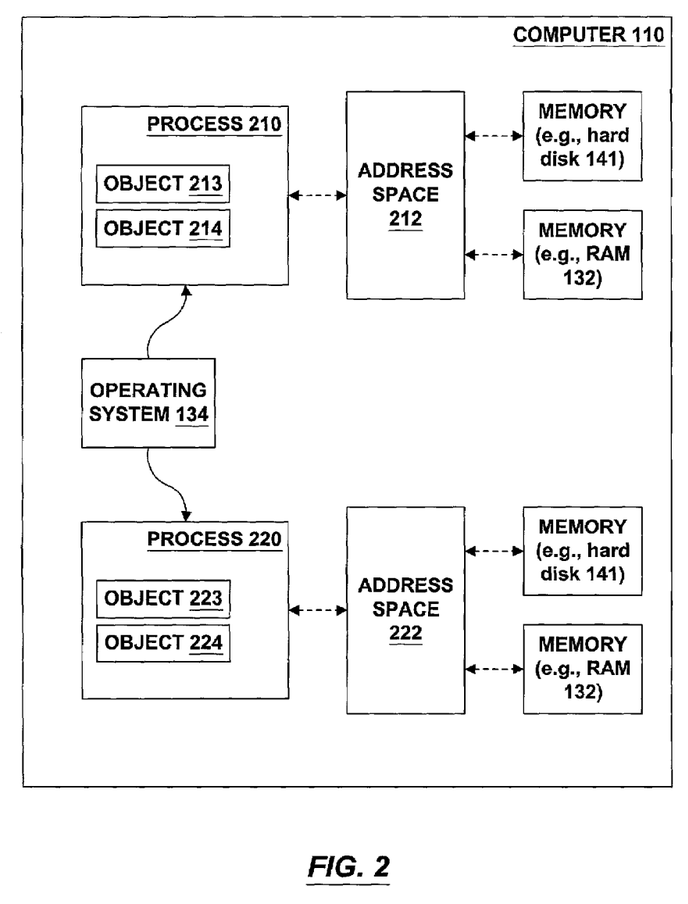
FIG. 2 is a block diagram of a plurality of processes having separate address spaces.

FIG. 2 shows the exemplary case of two processes running concurrently within the same environment on computer 110. Process 210 is associated with an address space 212. Address space 212 defines a block of memory that can be accessed (i.e., read or written) from within process 210. Address space 212 may comprise a fixed block of physical memory locations on a physical memory device (e.g., RAM 132). Alternatively, address space 212 may comprise a block of "virtual memory," wherein the contents of address space 212 are stored across (and copied back and forth between) various physical devices (e.g., hard disk 141 and RAM 132) in a manner determined by operating system 134. Virtual memory is known in the art, and is thus not described at length herein.

Software objects 213 and 214 may access memory locations in address space 212. Software objects 213 and 214 may use address space 212 to store or retrieve any type of data—e.g., data used or generated during operation of software objects 213 and 214, data that is being buffered for input or output, data that is being exchanged between software objects 213 and 214, etc. Additionally, the code for software objects 213 and 214 is generally stored in address space 212 while those software objects are executing within process 210.

Process 220 is associated with an address space 222 separate from address space 212. Address space 222 defines a block of memory that can be accessed from within process 220. Address space 222 may comprise physical or virtual memory. Software objects 223 and 224, which execute within process 220, may access memory locations in address space 222.

A significant feature of address spaces 212 and 222 is that they are accessible only from within the respective processes 210 and 220 with which they are associated. Thus, software objects 213 and 214 cannot access memory locations in address space 222 because they do not execute within process 220. Likewise, software objects 223 and 224 cannot access memory locations in address space 212 because they do not execute within process 210. Typically, this segregation of address spaces 211 and 212 is provided by operating system 134. For example, operating system 134 may keep track of the current execution "context" (i.e., which process is presently executing), and operating system 134 may refuse to read or write memory locations that have been allocated to the address space of a process other than the process that is currently executing. This method of segregation, however, is merely exemplary; one process may maintain data in any manner such that the data is relatively inaccessible to other processes, without departing from the spirit and scope of the invention.

Use of a Secure Process with a Non-Secure Software Object

Figure 3:
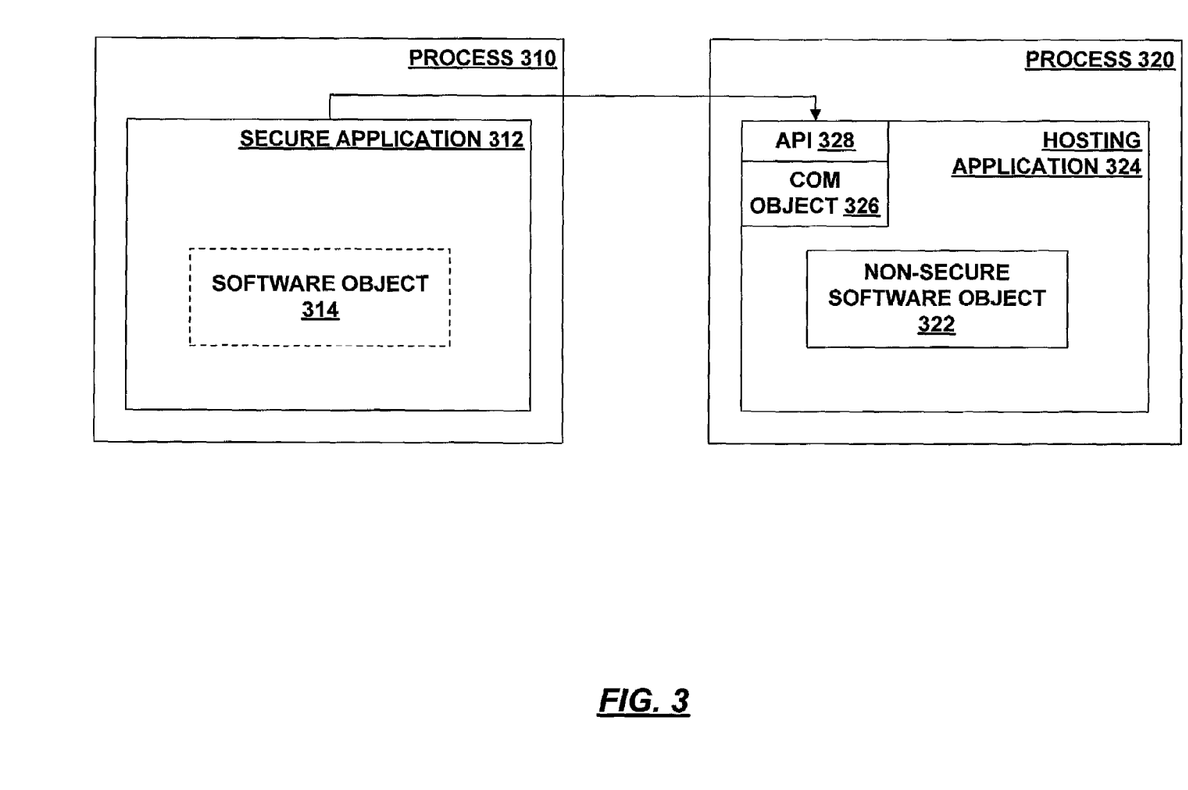
FIG. 3 is a block diagram of separate secure and non-secure processes in accordance with aspects of the invention.

FIG. 3 shows a secure application which uses a non-secure software object to perform an action or provide a service. Secure application 312 runs inside process 310. Application 312 is "secure" in the sense that it includes some type of defense against observation or modification. For example, secure application 312 may be an application that renders encrypted content, and which prevents or deters a user from learning the decryption key used to decrypt the content, or from copying the decrypted content itself. Typically, secure application 312 is relied upon by some system (e.g., a digital rights management system, or the participants therein) to behave in a predictable way (e.g., the distributors of content in a digital rights management system may rely on secure application 312 to render content only when permitted by the terms of a license). Secure application 312 may, optionally, host a software object 314.

Secure application 312 uses non-secure software object 322 to perform an action or provide a service that is not directly implemented within application 312. Non-secure software object 322 is "non-secure" in the sense that its behavior cannot be relied upon; for example, non-secure software object may be a program that imports and runs arbitrary code from a remote, non-authenticatable (possibly nefarious) source. A web browser is an example of such a non-secure software object 322, because it retrieves and executes scripts from remote locations that may or may not be trustworthy. As an example, application 312 may provide some type of web browsing capability to its user, but, rather than performing the actual web browsing functions itself, application 312 may call upon a general-purpose browsing program to perform the web browsing. In this exemplary case, non-secure software object 322 is such a web browsing program.

Hosting application 324 runs within process 320. Process 320 is separate from process 310. Hosting application 324 preferably contains minimal functionality; in one example, hosting application 324 contains just enough functionality to communicate with secure application 312 and to provide Object Linking and Embedding (OLE) container and hosting support so that OLE/COM objects (e.g., ActiveX controls, etc.) can be instantiated and managed. In a preferred embodiment, hosting application 324 provides a COM object 326 which exposes API 328, and secure application 312 communicates with hosting application 324 through API 328. (That is, secure application 312 communicates with hosting application 324 by calling various methods on API 328.) It will be understood, however, that this means of communication is merely exemplary, and secure application 312 may also communicate with hosting application 328 by other means (e.g., a messaging protocol, etc.) without departing from the spirit and scope of the invention.

In the exemplary case where hosting application 324 provides communication through COM object 326 and API 328, the API may provide a high-level interface which controls aspects of object hosting (e.g., the object's lifetime, whether the object is visible or invisible, etc.). The API may also provide a way to expose interfaces of the hosted object (e.g., non-secure software object 322). Additionally, COM object 326 may allow secure application 312 to receive events from non-secure object 322.

It should be understood that, to the extent that secure application 312 is, in fact, "secure," its security is not compromised by allowing it to communicate with hosting application 324. That is, neither hosting application 324, nor the non-secure object 322 that hosting application 324 hosts, has access to the address space of process 310. Thus, non-secure object 322 cannot inject rogue or hostile code into process 310. It should also be understood that secure application 312 is only as secure as the means used to protect it. There may be security "holes" in secure application 312 that allow an attacker of nefarious intent to subvert whatever "security" is provided by secure application 312. For example, secure application 312 may include integrity checks, code obfuscation, etc., or other "soft" security techniques in order to protect secure application 312 from observation or modification; all of these security measures can be broken with sufficient time and effort. However, using a separate process 320 to run non-secure software object 322 "protects" secure application 312 from non-secure software object 322 in the sense that non-secure software object 322 is not given direct access to process 310's address space that might be used to subvert the protection scheme of secure application 310.

Figure 4:
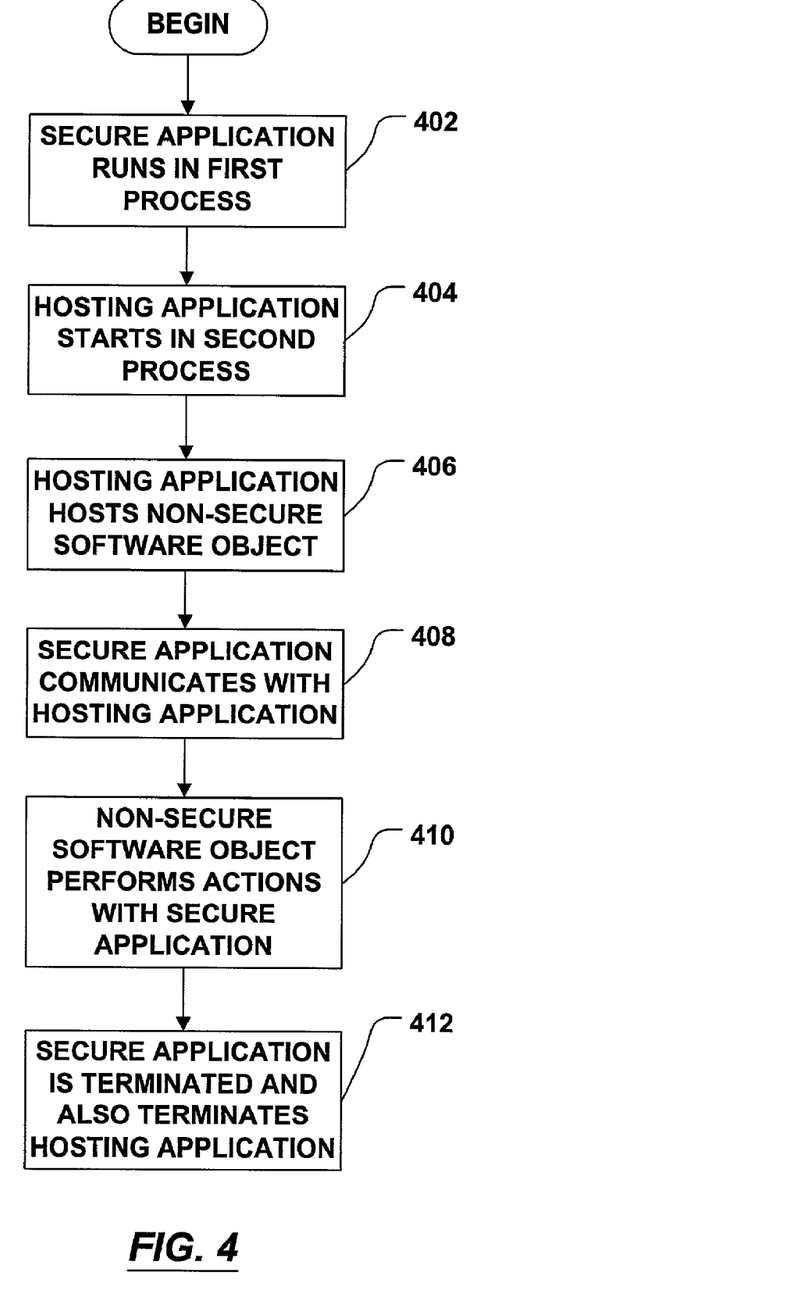
FIG. 4 is a flow diagram of an exemplary method whereby a secure application running in a first process invokes a non-secure software object in a second process.

FIG. 4 shows an exemplary method by which a secure application invokes a non-secure software object in a separate process. At step 402, a secure application (e.g., secure application 312, shown in FIG. 3), starts in a first process (e.g., process 310). At step 404, a hosting application (e.g., hosting application 324) is started in a second process (e.g., process 320). Preferably, the secure application starts the hosting application, although this need not be the case. For example, there may be a startup routine that starts the secure application in a first process, and that also starts the hosting application in a second process.

At step 406, the hosting application hosts a non-secure software object. The secure application may initiate the hosting of the non-secure software object—e.g., by instructing the hosting application to load and execute a non-secure software object within the (separate) process in which the hosting application runs. In one embodiment, the secure application issues the instruction to the hosting application through a COM API (e.g., API 328), as discussed above. Alternatively, the hosting application may be dedicated to hosting a particular software object (e.g., a particular hosting application may be dedicated to the function of hosting, say, a browser), in which case the hosting application instantiates a particular hosted object without receiving an instruction.

At step 408, the secure application communicates with the hosting application. As discussed above, this communication may take place through a COM API, a messaging service, etc. For example, the secure application may communicate with the hosting application to control basic hosting aspects (e.g., lifetime of a hosted software object, desired user interface state such as size, position, and visible/invisible settings, etc.) The API may expose certain aspects of the hosted software object's interface, thereby allowing the secure application to communicate with the non-secure software object through the hosting application. The secure application may also receive events from the hosted non-secure software object through the hosting application—e.g., where the hosted object is a web browser, the secure application may receive notice when the download of a page is complete, etc.

At step 410, the non-secure software objects performs the actions for which it has been invoked by the hosting application. The actions performed by the non-secure software object may include any type of action that software is capable of performing, and all such actions are within the spirit and scope of the invention. A specific, non-limiting example is discussed below, in which the non-secure software object is a web browser that performs web browsing functions for the secure content-rendering application of a digital rights management system.

At step 412, the secure application shuts down. This shutdown, in a preferred embodiment, also shuts down the auxiliary process of the hosting application, thereby unloading any non-secure objects hosted in the hosting application. This frees resources of the computer and return it to the state it was in prior to step 402.

EXAMPLE

Using a Web Browser with a Secure Rendering Application

A non-limiting example of the technique of the present invention is the case in which a secure rendering application offers a web browsing function. Such a secure rendering application may be part of a digital rights management (DRM) system—i.e., a system that supports the controlled usage of digital content (e.g., text, audio, video, etc.) in a manner that respects the rights of the owner of the content. For example, digital content may be delivered in an encrypted form, such that it may be decrypted and rendered by a secure rendering application. A premise of a typical DRM system is that the secure rendering application will not permit the content to be used in any manner that is not permitted by the terms of the content owner—e.g., the secure rendering application may render the content, but will not permit the decrypted content to be copied. Such a system must protect itself and the content from attacks—i.e., the application must resist attempts by a hacker to "steal" decrypted content or a decryption key. Since the decrypted content and/or the key may be stored in memory (e.g., in the address space of the process that runs the application), unknown or non-secure executable objects cannot be granted access to that address space, and thus cannot run in the same process as the secure rendering application.

A web browser is an example of a non-secure object that should not be granted access to an address space where decrypted content or decryption keys may be stored. Although certain commercially-available browsers may be a "known quantity" that can be trusted not to content subversive code, one feature of a browser is that it can load and run arbitrary code from unknown sources—e.g., in the form of an ActiveX® control, a JAVA script or applet, etc. Thus, if the browser runs in the same process as a secure rendering application, the browser could be used to unwittingly download an ActiveX® control that would locate a buffer used by the rendering application to store decrypted content and, say, store that content to the hard disk.

Nevertheless, it may be desirable for the secure rendering application to provide certain web browsing services—e.g., it may be useful for the user to be able to use the secure rendering application to shop on-line for digital content that can be rendered by the secure rendering application. Thus, the secure rendering application may provide web browsing services without giving a web browser access to the address space used by the secure rendering application.

In this example, the secure rendering application runs inside a first process. The secure rendering application uses the address space of the first process to store, among other things, decryption keys and decrypted content. At some point during the operation of the secure rendering application, the user may invoke a web browsing feature to shop for content. At this point, the secure rendering application directs that a hosting application be instantiated in a second process. The hosting application then hosts a browsing program. The hosting application may function as a COM server and may expose an API. Thus, the secure rendering application can direct the operation of the hosting application and the hosted web browser through the API. The secure rendering application may instruct the browsing program to render a list of links that the user may visit. If the user clicks on any of the links, the browsing program will retrieve the web page associated with that link and display it to the user. It should be observed that it is the browsing program, and not the secure rendering application, that performs the retrieval of web pages. It should further be observed that the downloading of an arbitrary web page in the browser does not, in and of itself, compromise the security of the secure rendering application; since the browser executes in the second process, it has no access to the address space of the secure rendering application that runs in the first process.

Preferably, integration between the secure rendering application and the browsing program is as transparent as possible. That is, when the user invokes the secure rendering application, the user should not be aware (and likely does not care) that some of the application's function (i.e., the web browsing function, in this case) is being provided by a separate program running in a separate process. One way to accomplish this transparency is for the browser to render its output in a place that makes it appear as if the output were generated by the secure rendering application. In a typical example, this means that the secure rendering application is assigned a "window" on the user's display, where the window has a location. In this case, the browser may be assigned a window that is in the same location as the secure rendering application's window. Preferably, the window assigned to the browser is a child window of the secure application, which results in desirable behaviors as the two windows interact with each other.

Figure 5:
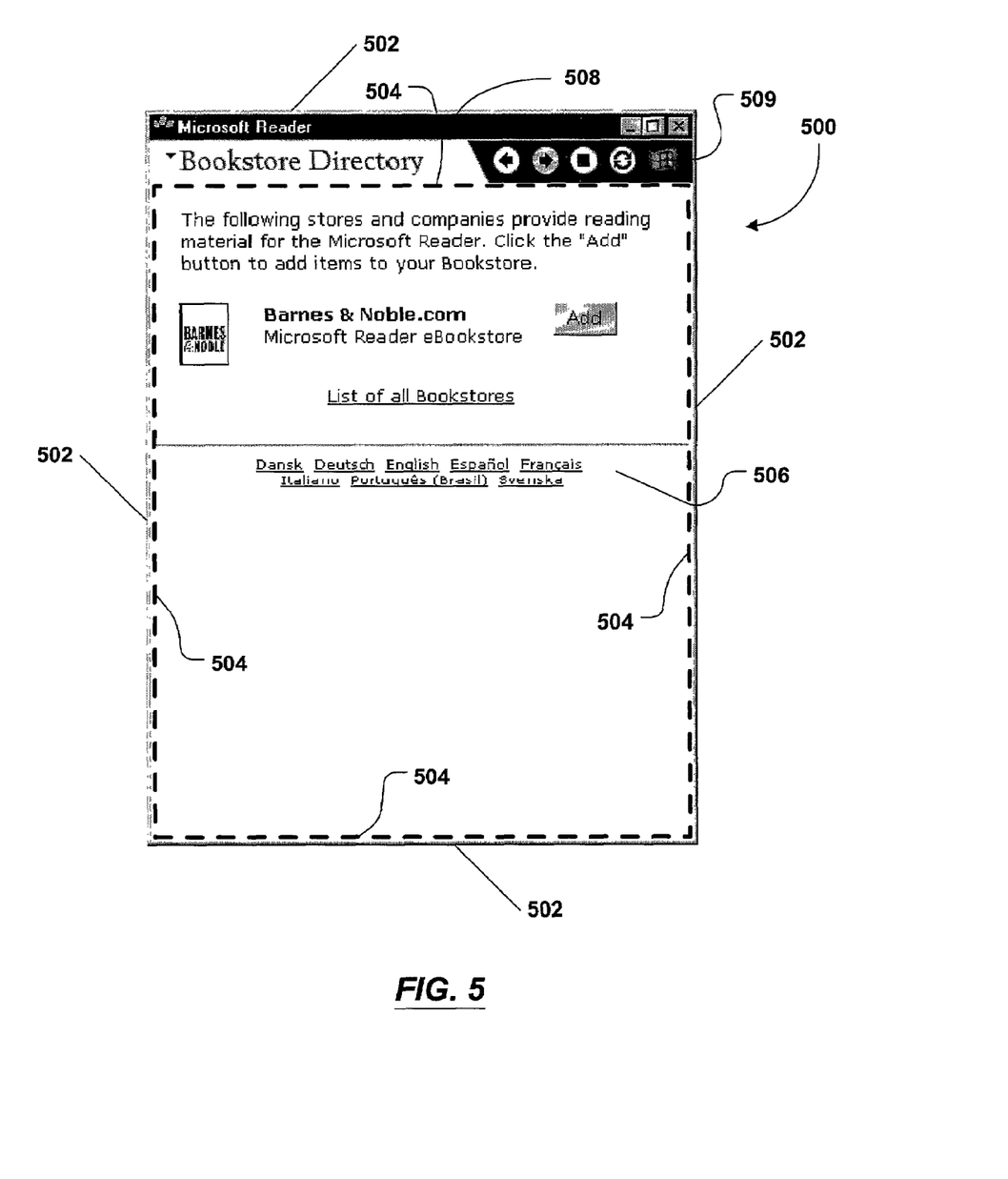
FIG. 5 is a diagram of spatially coinciding windows which are used to render the output of secure and non-secure applications, respectively, in accordance with aspects of the invention.

FIG. 5 shows an exemplary window 500 for a secure rendering application. Window 500 is a rectangular area defined by sides 502. All output from the secure rendering application is generated in window 500 within the perimeter defined by sides 502. In this example, a web browser is running in a separate process, and the web browser is assigned a separate window 506 defined by sides 504 (which are shown by relatively thick dashed lines in FIG. 5), and it will be noted that window 506 is positioned "on top" of window 500 and exists within a subset of the area for window 500. In the example of FIG. 5, the title area 508 and the navigational user interface elements 509 are part of the secure application. Such a design is preferable so that no additional user interfaces (besides the UI produced by the hosted non-secure object in the hosting application) needs to be produced by the hosting application. Window 506 may be a "child" of window 500. The web browser renders its output in window 506. Because of the location of window 506, the web browser may appear to a user as if it were part of the secure rendering application. The information in window 506 is generated by a web browser running in a separate process from the secure rendering application, but the title bar 508 and navigational user interface elements 509 are generated by the secure rendering application. The arrangement shown in FIG. 5 thus shows an exemplary technique for transparently integrating two applications that are running in separate processes.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of protecting data comprising the acts of:
creating a first process associated with a first address space, said first process comprising an executing trusted application;

creating a second process associated with a second address space, said first address space being inaccessible to said second process, said second process created by and controlled by said first process, said second process comprising an executing untrusted application;

running, in said first process, a first software object which stores data in said first address space;

running, in said second process, a second software object which accesses said second address space; and directing, by said first process, an action performable by said second software process.

2. The method of claim 1, wherein the data comprises encrypted content, and wherein said act of running said first software object comprises the act of:

starting in said first process an application which renders said encrypted content.

3. The method of claim 2, wherein said encrypted content comprises text.

4. The method of claim 2, wherein said encrypted content comprises video.

5. The method of claim 2, wherein said encrypted content comprises audio.

6. The method of claim 1, wherein the data comprises a cryptographic key, and wherein said act of running said first software object comprises the act of:

starting in said first process an application which uses said cryptographic key.

7. The method of claim 1, wherein said act of running a second software object comprises the acts of:

starting, in said second process, a hosting application;
hosting said second software object by said hosting application.

8. The method of claim 7, wherein said act of starting said hosting application comprises starting a component object model server.

9. The method of claim 1, wherein said second software object comprises a web browser which imports, from a remote computing device, code which accesses said second address space.

10. The method of claim 1, wherein said method is performed in a computing device having a display associated therewith, said method further comprising the acts of:

rendering an output of said first software object in a first window having a first region on said display; and rendering an output of said second software object in a second window different from said first window, said second window having a second region on said display.

11. The method of claim 10, wherein said second region at least partly coincides with said first region.

12. The method of claim 11, wherein said second window is wholly enclosed within said first window.

13. The method of claim 1, wherein said directing act comprises calling a method on an interface exposed by said second process.

14. The method of claim 13, wherein said second software object comprises a web browser, and wherein said method instructs said web browser to retrieve a web page from a remote location.

15. A computer-readable medium having computer-executable instructions to perform the method of claim 1.

16. A system for integrating a secure application with an open application on a computing device including a processor, said computing device further including an operating system which provides a plurality of processes, each process having an address space associated therewith, said system comprising:

a first trusted application executable on said processor in a first of said plurality of processes having a first address space, wherein said first trusted application accesses protected data in said first address space, and wherein said first trusted application provides a service by using a pre-determined software object;

a second untrusted application executable on said processor in a second of said plurality of processes having a second address space, said second process created and controlled by said first process, wherein said second untrusted application hosts said pre-determined software object, and wherein said second untrusted application exposes a callable interface to said first trusted application, said first address space being inaccessible to said second process.

17. The system of claim 16, wherein said first application directs the actions of said pre-determined software object by communicating instructions to said second application through said callable interface.

18. The system of claim 16, wherein said pre-determined software object comprises a web browser which imports, from a remote computing device, code which executes on said processor and which accesses data in an address space associated with a process in which said pre-determined software object executes.

19. The system of claim 16, wherein said first application protects said protected data from observation or modification.

20. The system of claim 16, wherein said computing device is coupled to a display, wherein said first application creates a first window in which said first application renders its output, said first window defining a first region on said display, and wherein said second application creates a second window in which said pre-determined software object renders its output, said second window being different from said first window, said second window defining a second region on said display.

21. The system of claim 20, wherein said second region coincides at least in part with said first region.

22. The system of claim 21, wherein said second window is wholly enclosed within said first window.

23. The system of claim 20, wherein said second window comprises a child of said first window.

24. The system of claim 16, wherein said first application instantiates one or more of: (a) said second application; or (b) the hosting of said pre-determined software object.

* * * * *